United States Patent [19]
Madden et al.

[11] Patent Number: 5,119,483
[45] Date of Patent: Jun. 2, 1992

[54] APPLICATION OF STATE SILOS FOR RECOVERY FROM MEMORY MANAGEMENT EXCEPTIONS

[75] Inventors: William C. Madden, Lexington; Douglas E. Sanders, Framingham; G. Michael Uhler, Marlborough; William R. Wheeler, Hudson, all of Mass.

[73] Assignee: Digital Equipment Corporation, Maynard, Mass.

[21] Appl. No.: 221,944

[22] Filed: Jul. 20, 1988

[51] Int. Cl.⁵ .................. G06F 9/38; G06F 11/00
[52] U.S. Cl. .................. 395/375; 364/DIG. 1; 364/231.8; 364/259.9; 364/285.2; 364/266.5
[58] Field of Search ... 364/200 MS File, 900 MS File

[56] References Cited

U.S. PATENT DOCUMENTS

| | | | |
|---|---|---|---|
| 4,075,688 | 2/1978 | Lynch, Jr. et al. | 364/200 |
| 4,236,206 | 11/1980 | Strecker et al. | 364/200 |
| 4,488,228 | 12/1984 | Crudele et al. | 364/200 |
| 4,493,035 | 1/1985 | MacGregor et al. | 364/200 |
| 4,521,851 | 6/1985 | Trubisky et al. | 364/200 |
| 4,524,415 | 6/1985 | Mills, Jr. et al. | 364/200 |
| 4,559,596 | 12/1985 | Ohnishi | 364/200 |
| 4,586,130 | 4/1986 | Butts, Jr. et al. | 364/200 |
| 4,703,481 | 10/1987 | Fremont | 364/200 |
| 4,855,904 | 8/1989 | Daberkow | 364/200 |

OTHER PUBLICATIONS

Sudhindra N. Mishra, "The VAX 8800 Microarchitecture", *Digital Technical Journal*, No. 4, Feb. 1987, pp. 20-33.
Troiani et al., "The VAX 8600 IBOX, A Pipelined Implementation of the VAX Architecture", *Digital Technical Journal*, No. 1, Aug. 1985, pp. 24-42.
Levy & Eckhouse, Jr., *Computer Programming and Architecture—The VAX-11*, Digital Equipment Corporation, 1980, pp. 358-360.

*Primary Examiner*—Thomas M. Heckler
*Attorney, Agent, or Firm*—Arnold, White & Durkee

[57] ABSTRACT

To reduce the processing time required for correcting a fault, the instruction decoder segment and the first execution segment of a pipelined processor are provided with "state silos" that are operative during normal instruction execution to save a sufficient amount of state information to immediately restart the instruction decoder segment and the first execution segment by reloading the state information having been stored in the state silos. The state silos, for example, include a queue of registers clocked by a common clocking signal that is inhibited during correction of the fault. When the fault is corrected, multiplexers select the state information from the silos to be used by the respective pipeline segments. In a preferred embodiment, the instruction decoder segment decodes variable length macroinstructions into operand specifiers and operations to perform upon the specifiers. The first execution segment receives control information when a new operand specifier or operation is decoded, and otherwise holds the previously received control information. A microsequencer issues a series of microinstructions for each specifier or operation having been decoded, and also issues a series of microinstructions in a fault routine when a fault occurs. The microsequencer is also provided with a state silo so that the normal sequence of microinstruction execution is resumed when the fault is corrected.

20 Claims, 10 Drawing Sheets

APPLICATION OF STATE SILOS FOR RECOVERY FROM MEMORY MANAGEMENT EXCEPTIONS

BACKGROUND OF THE INVENTION

1. Field of the Invention

The present invention relates generally to digital computers, and specifically to a pipelined central processing unit.

2. Description of Related Art

Pipelining is a proven method for enhancing the performance of the central processing unit (CPU) in a digital computer. In a pipelined CPU, multiple functional units concurrently execute the elementary operations for a plurality of instructions.

Computer systems often employ "virtual memory" techniques that allow programs to address more memory than is physically available. The portions of program or data that are not currently in use are stored in disk storage and are transferred when needed into physical memory. This loading of pages from disk when a nonresident memory location is accessed (i.e., when a "page fault" occurs) is called "demand paging."

In systems having virtual memory, a high speed associative memory called a "translation buffer" is often used to translate virtual addresses to the physical memory addresses. The translation buffer caches the most recently used virtual-to-physical address translations. If a desired translation is not present in the translation buffer (i.e., a translation buffer "miss"), the translation process must halt while the desired translation is read from a translation table in memory and loaded into the translation buffer. The construction and operation of the translation buffer is further described in Levy & Eckhouse, Jr., *Computer Programming and Architecture—The VAX-11*, Digital Equipment Corporation (1980) pp. 358-359.

In many computer systems, the execution of an instruction may cause an unusual condition called an "exception" to occur that causes the CPU to change the flow of control. Depending upon the instruction architecture, exceptions called "faults" may arise in the middle of execution for an instruction. In a computer system having virtual memory, for example, a "page fault" will occur during instruction operand fetching when the addressed operand does not reside in physical memory. In this case the current instruction cannot be completed, but it is desirable to use the CPU itself to carry out the demand paging to bring the desired operand from disk to physical memory.

When a "fault" occurs, the registers and memory are preserved so that the instruction can be restarted and produce the correct results after the fault condition is cleared. Therefore, the program counter is left pointing at the instruction that caused the fault.

In a pipelined processor, a fault causes the processing in the pipeline to be interrupted. Usually, everything that entered the pipeline before the instruction causing the fault is allowed to complete. Everything else that entered the pipeline later is prevented from completing, typically by clearing or flushing the respective stages of the pipeline.

In many pipelined processor designs, the control signals for the functional units are obtained from microinstructions issued by a microsequencer. In such a processor, several microinstructions may have partially executed when an exception condition is detected. In that case it is necessary to undo the effects of all those microinstructions. The most common technique used to deal with such situations is called a microtrap. Since microtraps relate closely to the micromachine execution, every processor has its own scheme to implement them. In every case, however, microtraps must permit the "roll back" of some number of microinstructions because the detection of a trap condition usually occurs quite late with respect to microinstruction execution.

A pipelined processor controlled by microinstructions is described in Sudhindra N. Mishra, "The VAX 8800 Microarchitecture," *Digital Technical Journal*, No. 4, February 1987, pp. 20-33. In the VAX 8800 processor, microtraps are implemented so that the offending microinstruction is allowed to complete, but subsequent microinstructions in the pipeline are blocked. Since the offending microinstruction may have caused some undesirable results, the trap handler microcode must fix the problem. Depending on the particular situation, either the microinstruction execution flow is resumed from the clocked state or a new flow is originated. A silo is generally used to save the state of the machine across a microtrap. In most cases the length of the silo is equal to the depth of pipelining. Since there are many more branch-condition bits than microaddress bits, it is more economical to save microaddresses in the trap silo than to save the conditions causing those addresses. During the execution of the trap routine, the trap silos are "frozen" (blocked from loading), thus saving the state of the micromachine at the time of trap.

In order to simplify the additional circuitry required for memory management, it is desirable to make use of the pipeline resources to resolve memory management faults such as a "page fault" or a "translation buffer miss." A memory management microroutine could be invoked as an interrupt as described above. In this case instructions having entered the pipeline before the instruction causing the trap would be completed and everything else having entered the pipeline later would be restored or backed up (with the program counter pointing to the instruction having caused the fault) prior to invocation of the memory management microroutine. Faults requiring invocation of system routines, for example, have been handled as macrocode interrupts.

SUMMARY OF THE INVENTION

The present invention is applicable to a pipelined processor of the kind having a plurality of pipelined segments including an instruction decoding segment and a plurality of instruction execution segments. During the normal sequence of operation, the instruction decoding segment decodes instructions one after another to generate a sequence of control information which is passed to the first instruction execution segment. The plurality of execution segments process data sequentially and simultaneously in respective pipelined data processing units in response to the control information while the decoding segment is generating new control information. The execution segments include at least a memory unit for storing and fetching the data and a functional unit for performing operations upon the data. This processing of data is capable of causing a fault which must be corrected before the processing of the data can be completed. The fault is corrected by interrupting the normal sequence of instruction execution in the pipeline and using the pipeline resources to correct the fault.

In order to reduce the processing time required for correcting the fault, the instruction decoder segment and the first execution segment are provided with "state silos" that are operative during normal instruction execution to save a sufficient amount of state information to immediately restart the instruction decoder segment and the first execution segment by reloading the state information having been stored in the state silos. Therefore, when the fault occurs there is no need to "unwind" or "back up" the pipeline because the state information that must be saved has already been saved in the state silos, and execution of a fault routine can begin immediately to correct the fault. Once the fault is corrected, the instruction decoder segment and the first execution unit segment are restored with state information reloaded from the silos to resume the normal sequence of instruction execution. The state silos, for example, include a queue of registers clocked by a common clocking signal that is inhibited during correction of the fault. When the fault is corrected, multiplexers select the state information from the silos to be used by the respective pipeline segments.

In a preferred embodiment of the invention, the instruction decoder segment decodes variable length macroinstructions into operand specifiers and operations to perform upon the specifiers. The first execution segment receives control information when a new operand specifier or operation is decoded, and otherwise holds the previously received control information. A microsequencer issues a series of microinstructions for each specifier or operation decoded by the instruction decoder segment, and also issues a series of microinstructions in a fault routine when a fault occurs. Respective state silos are provided for the instruction decoder segment, the first execution segment, and the microsequencer segment so that the microsequencer can immediately begin issuing microinstructions in the fault routine when a fault occurs, and when the fault is corrected the issuing of microinstructions for the normal sequence of instruction execution can immediately resume.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Figure 1:
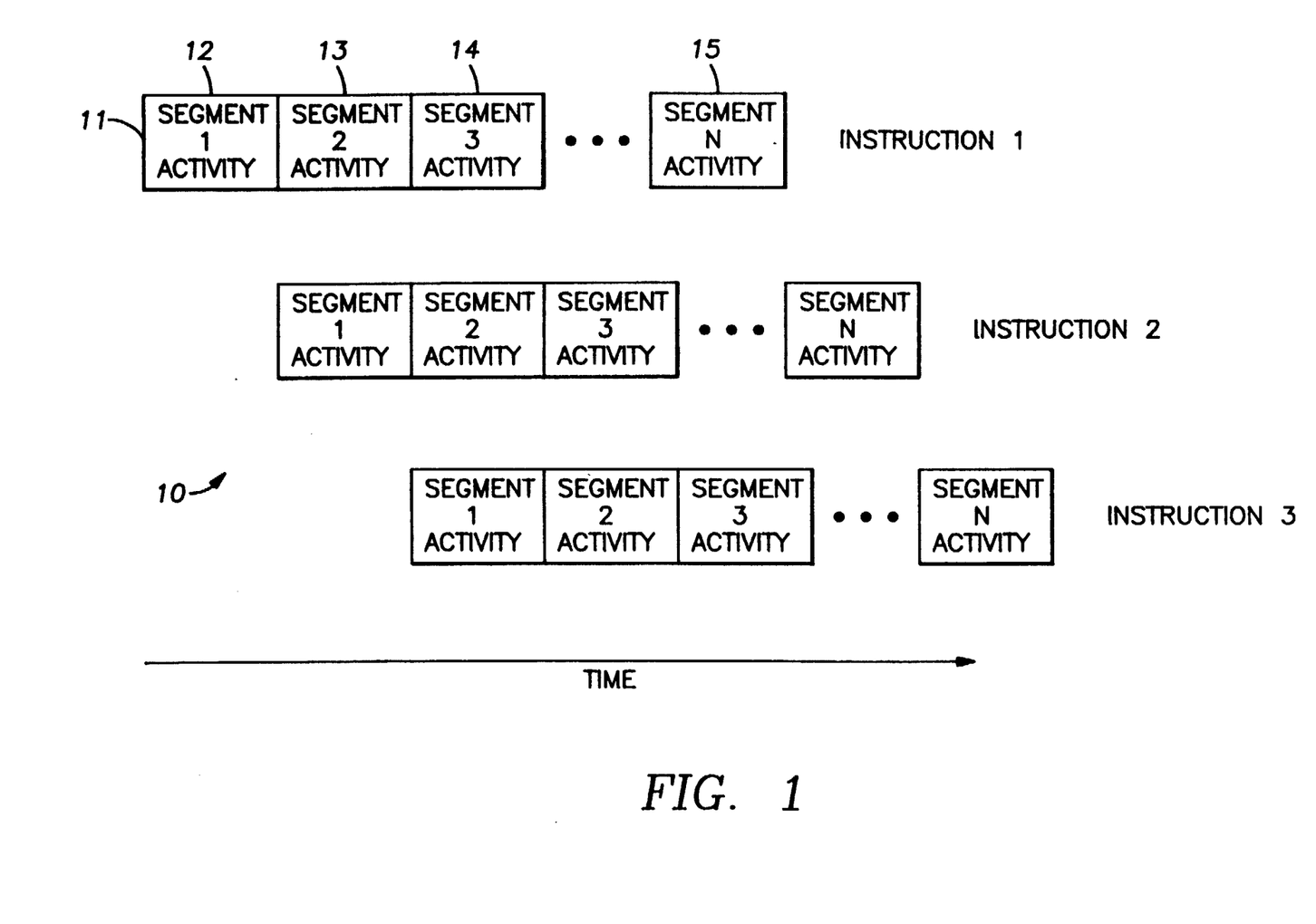
FIG. 1 is a timing diagram showing various activities performed in respective data processing units in a pipelined processor to concurrently execute a plurality of instructions.

Turning now to FIG. 1, there is shown a diagram 10 which illustrates the overlapped execution of instructions in a pipelined processor. The execution of each instruction is divided into several activities 11, each of which takes a fixed amount of time. Each activity is assigned to and performed by a respective pipeline segment. After the first pipeline segment completes its activity 12, instruction execution continues in the next segment, and this process continues for all segments of the pipeline. By assigning the activities of the instruction to respective segments of a pipeline, a new instruction may be started as soon as the first activity of the prior instruction has been completed by the first segment of the pipeline.

Figure 2:
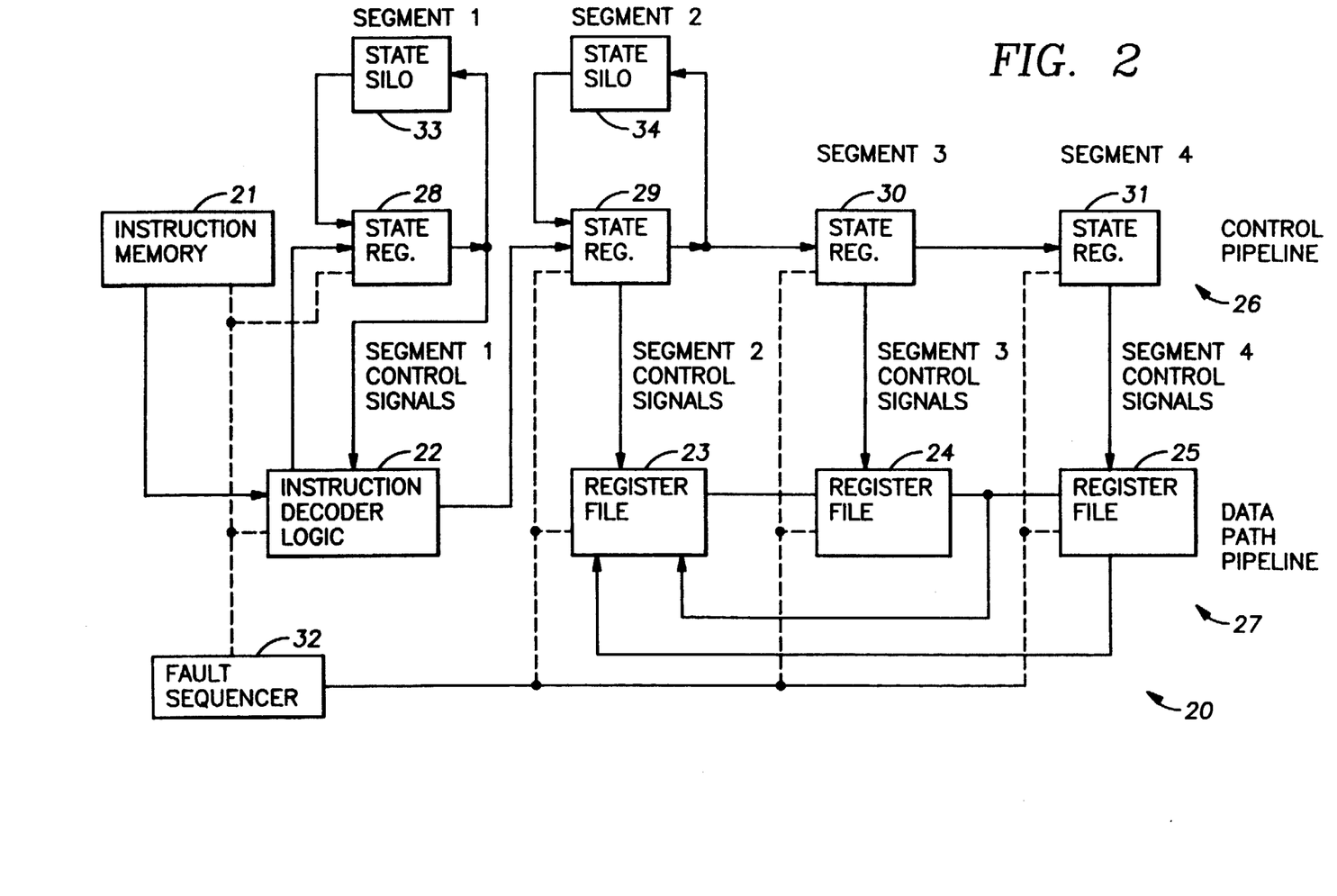
FIG. 2 is a block diagram of a four stage pipelined processor incorporating the present invention.

In one widely used pipeline organization, the execution of each instruction is divided into four activities which are performed by the pipelined processor (20 in FIG. 2). During the first activity 12, the instruction is read from an instruction memory or buffer (21 in FIG. 2) and decoded by a decoder (22 in FIG. 2). During the second activity 13, the operands for the instruction are accessed from fast, local storage such as a register file (23 in FIG. 2). During the third activity 14, the operation specified by the instruction is performed in a functional unit 24 such as an arithmetic logic unit (ALU). During the fourth and final activity 15, the results from the functional unit 24 may either be written back to the register file (23 in FIG. 2) for later use during execution of another instruction, or used to address a memory (25 in FIG. 2) to perform a read or write.

As further shown in FIG. 2, the preferred implementation of the pipeline 20 consists of two parallel structures: a control pipeline 26, and a data path pipeline 27. The data path pipeline 27 includes four data path segments (decoder 22, register file 23, functional unit 24, and memory unit 25) that are supplied with control information from respective control segments 28-31 in the control pipeline 26. Each control segment includes a pipeline register storing state information governing the operation of the respective data segment. The instruction decoder logic 22 and the first control segment 28, for example, form a sequential state machine in which the instruction decoder logic determines the next state of the first segment based upon its present state. Instruction execution involves decoding an instruction in the first segment and then moving control information down the pipeline, through one control segment each cycle. This, in turn, controls the corresponding data path segments 22-25.

The control segments are designed to control the data path segments during the normal sequence of instruction execution following the decoding of each instruction. The normal sequence of instruction execution means that instructions are fetched sequentially from the instruction memory 21 and executed one after the other, beginning at an initial address (e.g., the "reset vector") or the "target" address of a "branch" instruction. The normal sequence of execution, however, can be interrupted by an exception that requires coordinated control of the pipeline segments. The coordinated control is provided by a fault sequencer 32.

In systems with virtual memory, part of the memory operation involves translating the virtual address supplied by the pipeline to a physical address. One very common technique used to translate addresses is a small cache of most recently used translations called a "translation buffer," and commonly denoted by the symbol "TB."

Figure 3:
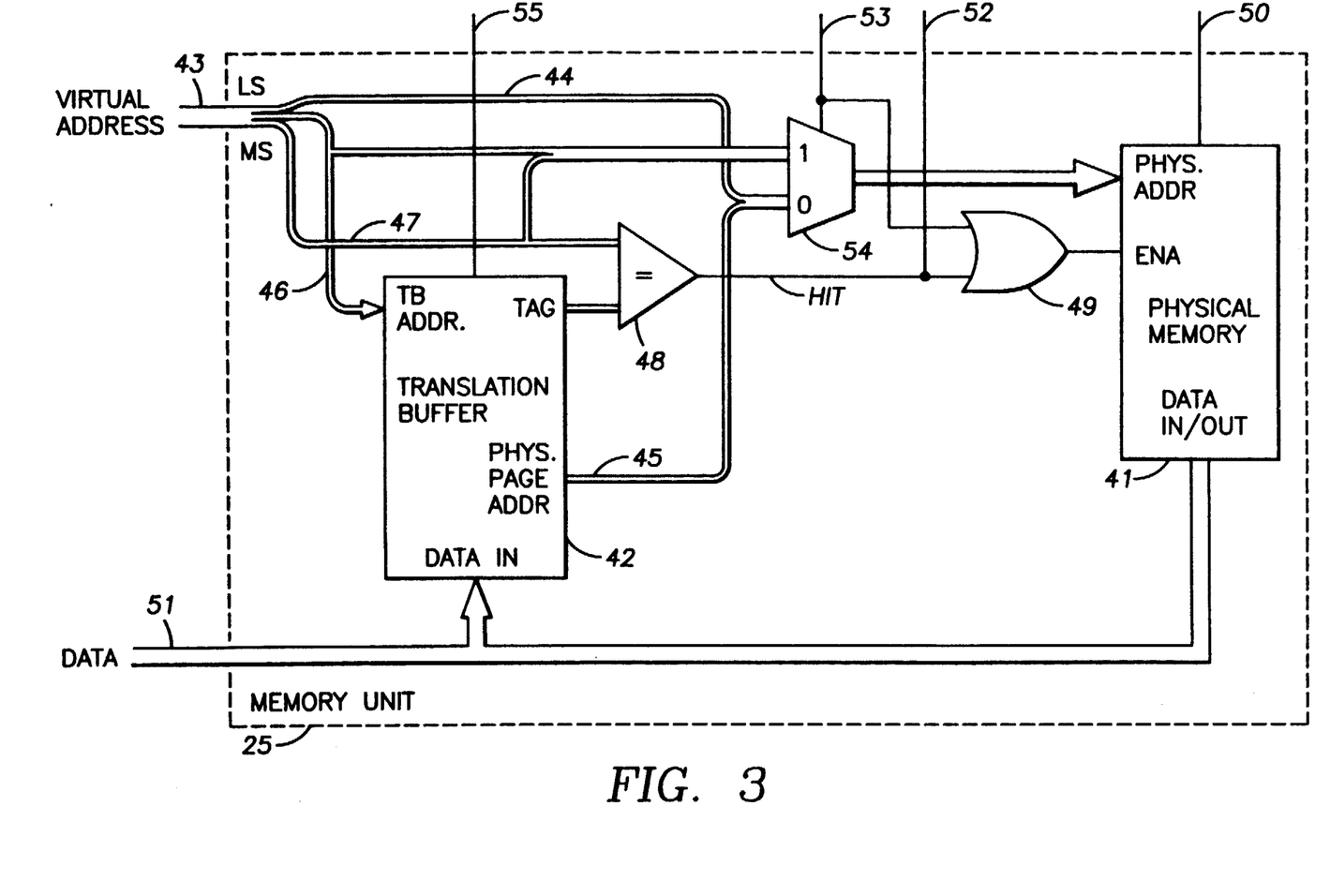
FIG. 3 is a functional schematic diagram of a memory unit used in the pipelined processor of FIG. 2 and which incorporates a translation buffer for translating virtual to physical addresses.

As shown in FIG. 3, the memory unit 25 preferably has a "physical" memory 41 and a translation buffer 42. During normal operation the translation buffer 42 translates "virtual addresses" on the processor's address bus 43 to "physical addresses" supplied to the physical memory 41.

The translation buffer 42 is organized as an associative memory or cache that maps pages of virtual memory to pages of physical memory. The position of a byte or word of data in a page is determined by a least significant (LS) portion of the virtual address which is applied over a bus 44 to the address input of the physical memory 41. The page address in physical memory, however, is normally obtained from a first data output bus 45 from the translation buffer 42 when the translation buffer is addressed with the virtual page address.

Since it is desirable to perform both a virtual address translation and a memory read or write in a single cycle, the translation buffer 42 is made of very high-speed memory. Therefore, it is not economically feasible to provide enough high-speed memory to store a complete translation table for all possible virtual page addresses. Instead, the translation buffer stores only a partial translation table for previously accessed virtual pages, and these previously accessed virtual pages are arranged in the translation buffer according to the least significant portion of their respective page addresses. In other words, the high-speed memory of the translation buffer is addressed by an address bus 46 which carries a least significant portion of the virtual page address.

Since the translation buffer stores only a partial translation table, it is possible to address the translation buffer 42 with a virtual page address that does not currently have a translation stored in the translation buffer. In order to detect this fault condition, the translation buffer 42 stores a respective "tag" along with each physical page address stored in the buffer, and the respective "tag", concatenated with the translation buffer address on the bus 46, indicates the complete virtual page address associated with the respective physical page address stored in the translation buffer. Therefore, in order to determine whether the translation buffer is being addressed with a virtual page address having a translation currently stored in the translation buffer, the most significant portion of the virtual page address is applied over a bus 47 to a comparator 48 which compares it to the tag read from the translation buffer. If there is a match or "hit", the proper translation is currently in the translation buffer, and in this case an OR gate 49 enables the physical memory 41 to be accessed at the translated physical address. A read or write occurs as determined by a control line 50, and the data read or written passes over a data bus 51.

The above description of the operation of the translation buffer assumes that it has a "direct mapped" organization. It is well known that other organizations can be used, for example, "set associative" or "fully associative" organizations. The particular organization of the translation buffer is not important to practicing the present invention.

If a proper translation for the virtual address is not found in the translation buffer 42, a translation table in the physical memory 41 must be read and transferred to the translation buffer. As further described below, the fault sequencer 32 does this by using the pipeline facilities. The translation buffer fault is signalled by the "hit" signal not being asserted on a line 52 when a memory access operation is requested by the memory unit control segment (31 in FIG. 2). In response to the translation buffer fault, the fault sequencer accesses the physical memory 41, for example, by asserting a signal on a control line 53 to enable a multiplexer 54 to bypass the translation buffer 42 and permit the address bus 43 to address the required translation table. The control signal on line 53 is also fed to the OR gate 49 to enable the reading of the physical memory 41. The fault sequencer 32 also activates a control line 55 to enable the translation buffer to read the new translation data, which is received from the data bus 51.

Figure 4:
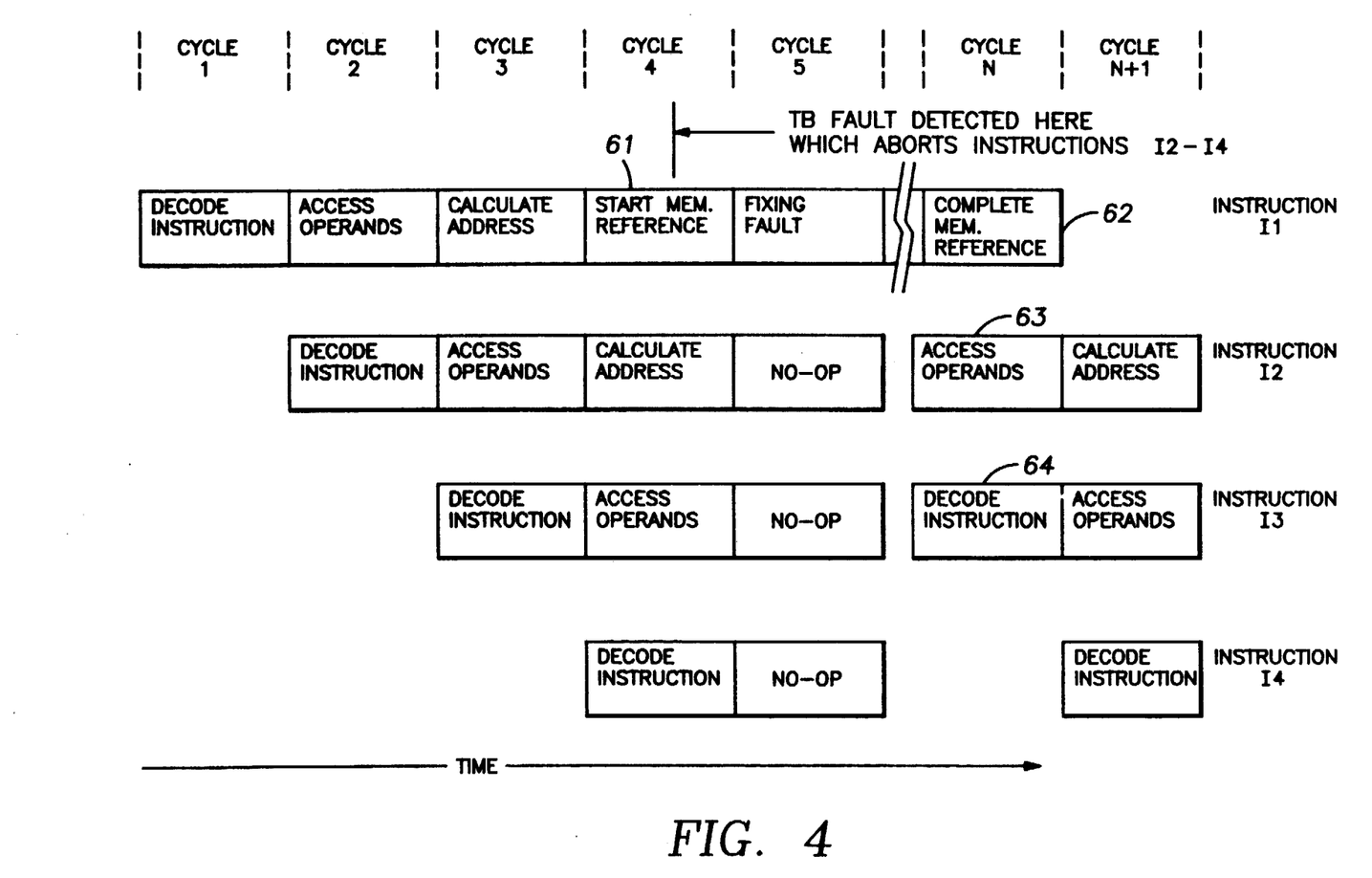
FIG. 4 is a timing diagram corresponding to FIG. 1 illustrating the operation of the pipelined processor of FIG. 2 when a translation buffer fault occurs.

FIG. 4 illustrates how the execution of instructions is affected when a translation buffer fault occurs. If an instruction references a virtual address that is not in the translation buffer, the fault is not detected until the instruction reaches the fourth segment of the pipeline and the memory is accessed during the memory activity 61. When the fault is detected, activities for three subsequent instructions are in progress.

To correct the translation buffer fault, the fourth segment of the pipeline must stop the original memory reference, read the translation from the table in physical memory, add it to the translation buffer, and restart the original memory request. This process requires use of the pipeline and may take multiple cycles. Multiple cycles are required, for example, to allow programs to address more "virtual memory" than is available in the physical memory (41 in FIG. 3). In this case, for example, a translation buffer fault will occur when a page of non-resident memory is addressed. When the translation table is read from the physical memory to cure the translation buffer fault, an entry in the table is read to determine whether the desired page is resident in the physical memory. If not, then the "page fault" must be corrected by execution of a "demand paging" routine that transfers the desired page from disc memory to the physical memory, and updates the translation table in the physical memory.

Since the pipeline is used to correct the translation buffer fault, instructions I2, I3, and I4 must be aborted after sufficient state information is saved to restart the normal sequence of execution once the fault is solved. As shown in FIG. 4, the instructions I2, I3 and I4 are aborted by inserting "no-op" instructions into the pipeline in cycle 5. In this example, the instruction I1, however, is completed by the fault sequencer since the address for completing the memory activity, and any data to be written into the memory unit, can be temporarily saved in registers in the functional unit (24 in FIG. 2) or the memory unit (25 in FIG. 5).

In accordance with an important aspect of the present invention, state information for at least the first and second control segments is saved during normal pipeline operation so that the state information is immediately available to restart the normal sequence of execution after the fault is solved. Therefore as soon as a fault is detected, the pipeline can be immediately flushed and fault processing can begin without the need for restoring the pipeline before flushing or beginning fault processing.

The required state information for the first and second pipeline segments is stored in respective registers or queues (33, 34 in FIG. 2) called "state silos." State information is clocked into the "state silos" during each pipeline cycle. When a translation buffer fault is detected the clocking of the state silos is stopped, and instructions in the pipeline are aborted. The fault sequencer executes a trap routine to use the pipeline to resolve the translation buffer fault. When the fault is resolved, the required state for resuming the normal sequence of execution is loaded into the pipeline from the state silos.

The state at which the normal sequence of execution resumes depends upon the specific organization of the control pipeline 20. If the state information in each segment of the pipeline is sufficient to properly restart its respective activity (e.g., each control segment stores the complete information for controlling its respective activity for an instruction and initiating the subsequent activities for the instruction), then the state information saved in the silos (33, 34 in FIG. 2) for the first two segments can be used to properly restart each of their respective activities as shown in FIG. 4. The complete state information is reloaded into the first and second control segments (28, 29) from their respective silos (33, 34) when the translation buffer fault is just corrected. Therefore, in cycle n of FIG. 4, the translation buffer fault has been corrected and the complete state of segments 1 and 2 have been restored. In cycle n, instruction I1 is being completed in activity 62 controlled by the fault sequencer 32. At this time, instruction I2 is restarted by activity 63 in which selected registers of the register file (23) are accessed. Also in cycle n, instruction I3 is restarted by activity 64 in which instruction I3 is decoded. Normal execution continues in the next cycle n+1 without any participation by the fault sequencer.

Figure 5:
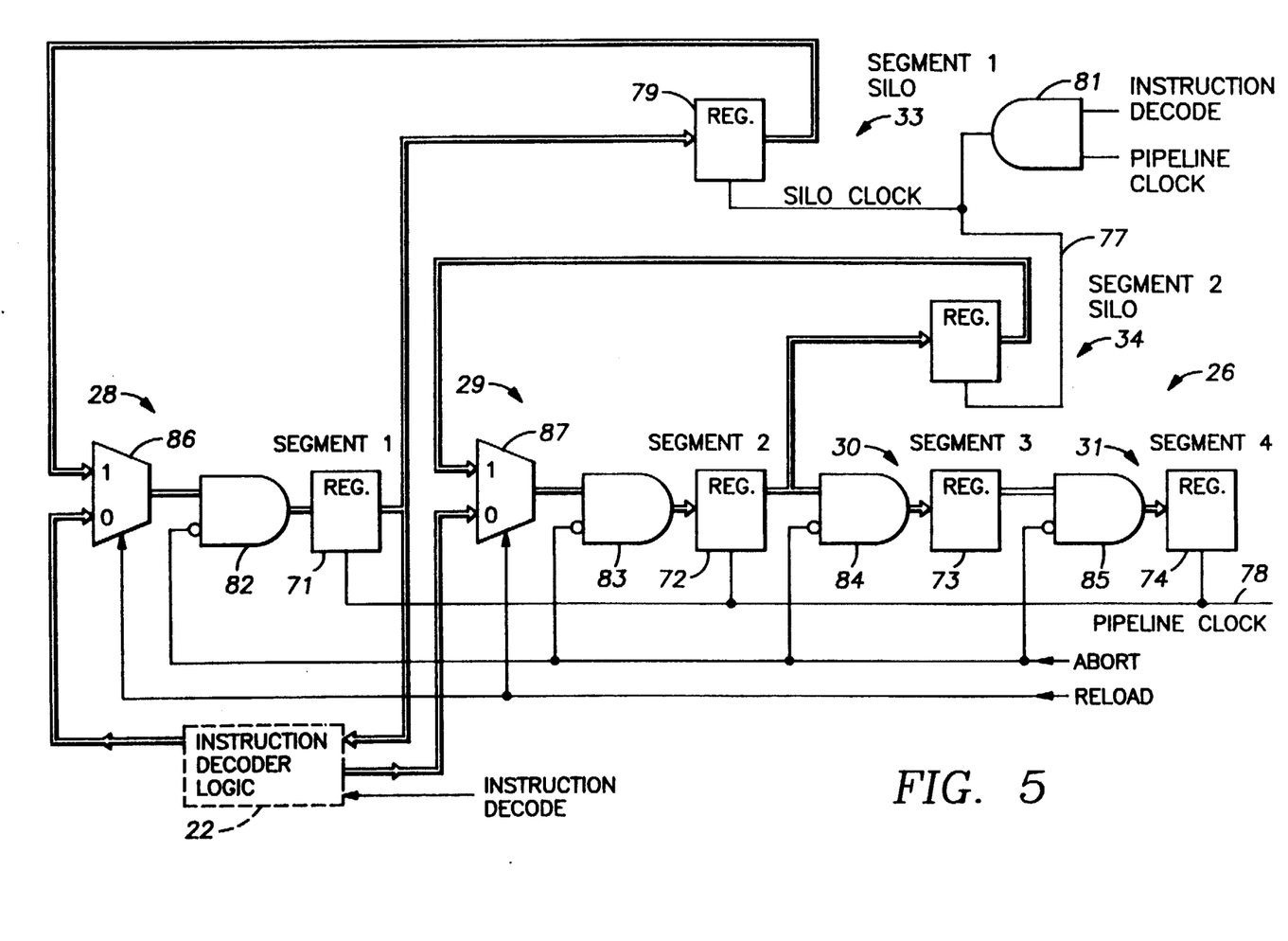
FIG. 5 is a detailed schematic diagram of the control pipeline used in the pipelined processor of FIG. 2.

Turning now to FIG. 5 there is shown a more detailed schematic diagram of the control pipeline 26 incorporating the state silos 33 and 34. The two state silos 33, 34 are controlled by a "SILO CLOCK" asserted on a line 77. In a similar fashion, the control pipeline segments 28, 29, 30, and 31 are controlled by a PIPELINE CLOCK asserted on a line 78. When instructions are being decoded, as indicated by a signal INSTRUCTION DECODE from the fault sequencer (32 in FIG. 1), both the PIPELINE CLOCK and the SILO CLOCK are asserted every cycle and cause both the control pipeline 26 and the silos 33, 34 to advance. The information in the silos 33, 34 corresponds to the instructions in the control pipeline.

There is provided one silo for each pipeline segment which must have its state restored to continue processing when the fault is resolved. In order to restore the sequence of instruction execution as shown in FIG. 4, the first segment 28 and the second segment 29 must have their states restored, so they have respective silos 33 and 34.

Each silo is in the form of a register or queue of registers which temporarily stores the state of the respective pipeline segment to be restored. The number of registers in each queue is equal to the delay, in pipeline clock cycles, between the instruction activity being performed in the respective segment when the fault is detected and the instruction activity that should be performed in the respective segment when the state of the respective segment is restored. From the timing sequence in FIG. 4, it is apparent that the segment 1 silo 33 should have one register 79 and the segment 2 silo 34 should have one register 80.

In order to abort the instructions in the pipeline, the control pipeline 26 has respective registers 71, 72, 73 and 74 separated by respective AND gates 82, 83, 84 and 85 which are inhibited by an ABORT signal so that each register 71-74 receives a "no-op" instruction. In general the preferred manner of aborting a pipeline depends on the specific construction of the pipeline and is not important for practicing the present invention.

When the fault is corrected the control pipeline state must be restored from the end of the silos to the appropriate pipeline segment. A selector or multiplexer is placed before each pipeline segment having a respective state silo to enable the pipeline segment to be loaded either from its silo or from the previous pipeline segment. A multiplexer 86, for example, is placed before the first segment 28 and selects either the output of the segment 1 silo 33 or the next state from the instruction decoder 22, and a second multiplexer 87 is placed before the second segment and selects either the output of the segment 2 silo 34 or the output of the instruction decoder 22.

In the normal sequence of instruction execution, the signal RELOAD is not asserted, and PIPELINE CLOCK is asserted every cycle. This will cause the next instruction to be advanced from the instruction memory (21 in FIG. 2) to the instruction decoder where it is decoded in accordance with the present state held by the segment 1 register 71 to determine the next state of the segment 1 register, which is fed back through the multiplexer 86. During the same clock cycle, the present state of the first segment register 71 is advanced into the register 79 of the first segment silo 33 and control information for the decoded instruction from the instruction decoder logic 22 is fed through the multiplexer 87 to the segment 2 register 72. In a similar fashion, the state having been in the segment 2 register 72 is advanced into the register 80 of the second silo 34 and into the segment 3 register 73.

Figure 6:
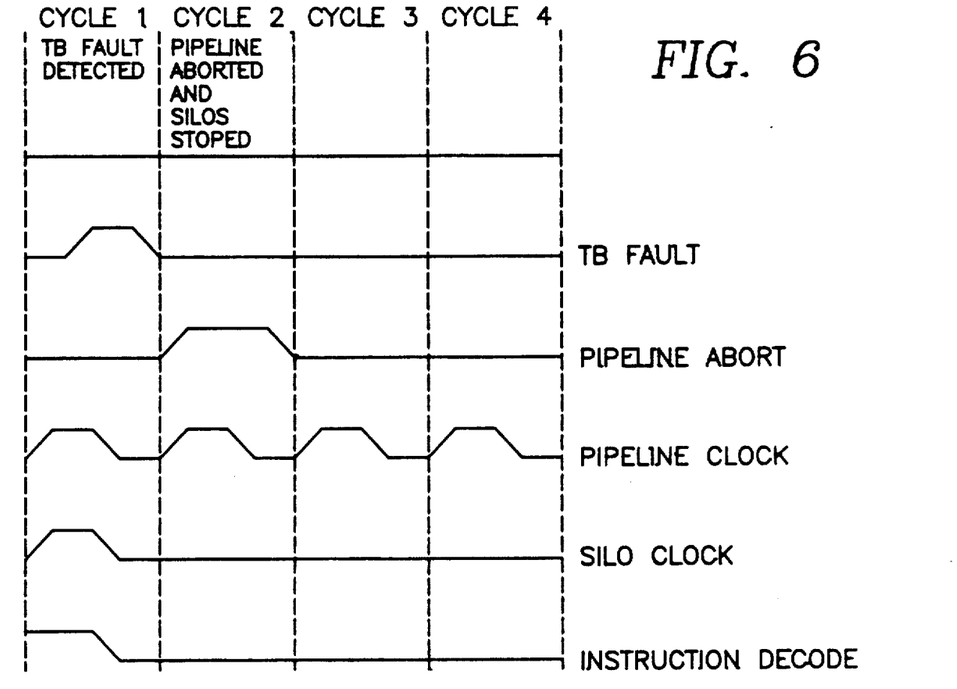
FIG. 6 is a timing diagram of control signals in the control pipeline of FIG. 5 when a translation buffer fault is detected.

FIG. 6 shows the timing for the control signals when a translation buffer fault is detected. The translation buffer fault is indicated by a signal TB FAULT which is asserted when the TB HIT signal of FIG. 3 is not asserted during a memory access. The PIPELINE ABORT signal causes the instructions currently in the pipeline to be aborted. The SILO CLOCK is inhibited to allow the silos to "hold" the information necessary to restart execution after the fault is corrected. The SILO CLOCK is generated by an AND gate (81 in FIG. 5) receiving the PIPELINE CLOCK and the INSTRUCTION DECODE signal from the fault sequencer. The pipeline is used by the fault sequencer to access memory during the correction of a translation buffer fault and, therefore, PIPELINE CLOCK is asserted every cycle.

Figure 7:
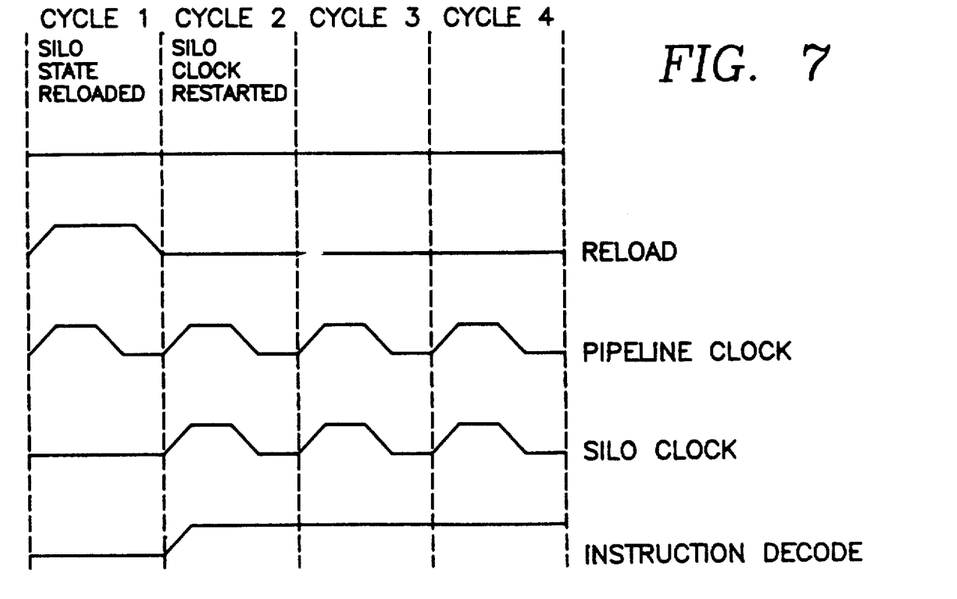
FIG. 7 is a timing diagram of control signals in the control pipeline of FIG. 5 when the translation buffer fault is corrected.

FIG. 7 shows a timing diagram of the control signals after the translation buffer fault is corrected. The signal RELOAD is asserted for one cycle, which causes the outputs of the silos to be loaded back into their respective pipeline segments through their respective multiplexers. In the next cycle, the signal RELOAD is deasserted, and the INSTRUCTION DECODE signal is asserted to restart the SILO CLOCK, which returns the pipeline to normal instruction execution.

Figure 8:
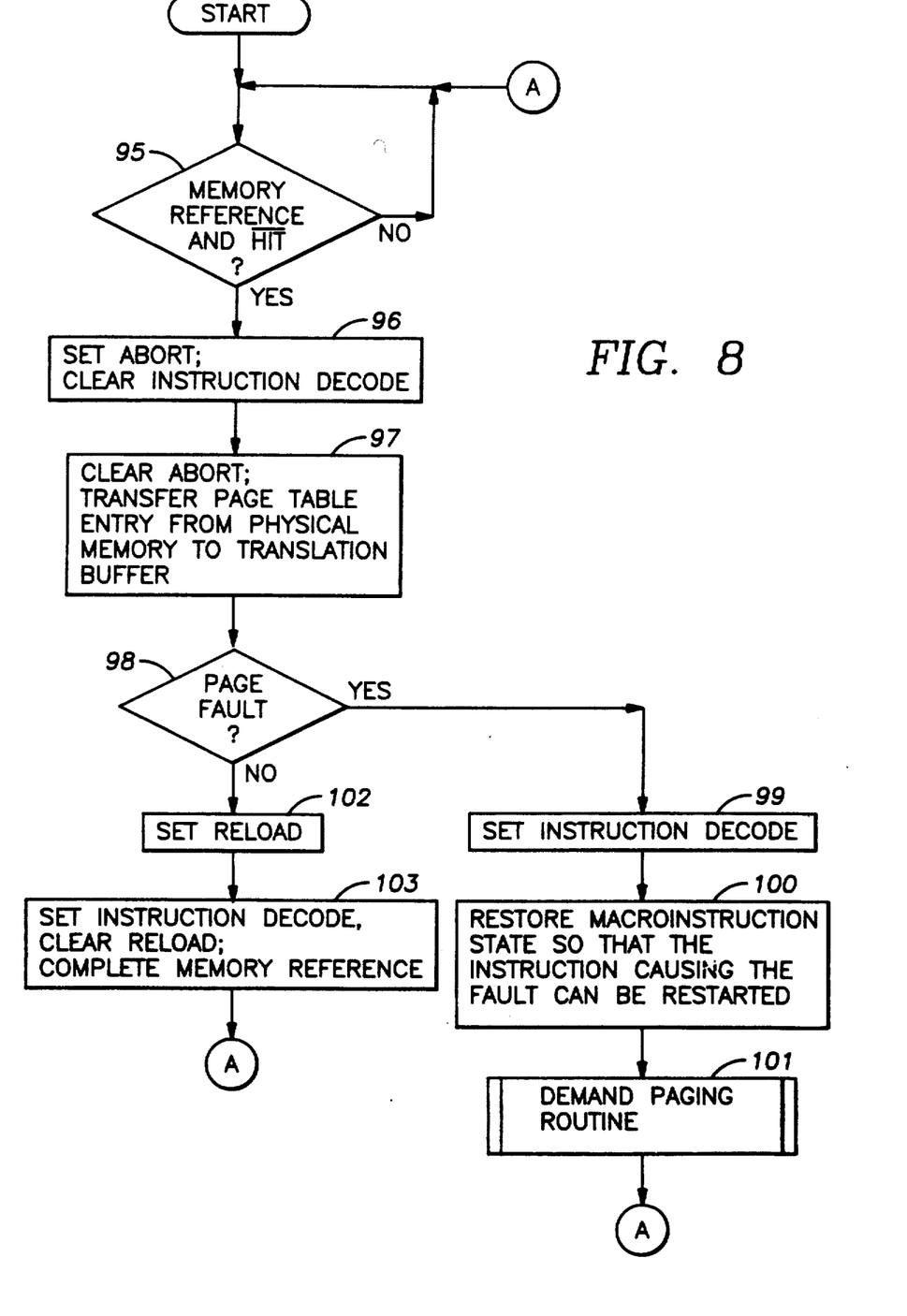
FIG. 8 is a flowchart illustrating the control sequence performed by a fault sequencer in the pipelined processor of FIG. 2 in order to initialize the control pipeline and detect and correct translation buffer faults in the fashion illustrated by the timing diagrams of FIGS. 6 and 7.

Turning now to FIG. 8, there is shown a flowchart generally designated 90 of the control sequence executed by the fault sequencer (32 in FIG. 2). In the first step 95, the fault processor checks for a translation buffer fault during the normal sequence of instruction execution. When a memory reference is attempted and the HIT SIGNAL is not asserted, a translation buffer fault is detected. In step 96, the ABORT signal is asserted, and the INSTRUCTION DECODE signal is deasserted. In step 97 during the next cycle the ABORT signal is deasserted, and the required page table entry is transferred from the physical memory (41 in FIG. 3) to the translation buffer (42 in FIG. 3).

During the transfer of the required page table entry, a particular bit in the entry is tested in step 98 to determine whether the desired page of data actually is stored in the physical memory. If not, then "demand paging" must be performed to obtain the desired page of data from a disc memory (not shown). In step 99 the INSTRUCTION DECODE signal is set in order to use the pipeline facilities. Then in step 100 the macroinstruction state of the pipelined processor is restored so that the instruction causing the fault can be restarted. In other words, the state of the pipelined processor is "backed up" so that the "program counter" points to the instruction having caused the fault. Then in step 101 a demand paging routine is executed by the fault processor in order to transfer the desired page of information from the disc memory (not shown) to the physical memory (41 in FIG. 3). When this transfer is complete, the page table entry in the physical memory (41 in FIG. 3) is updated to indicate that the page having been transferred now resides in physical memory. This involves clearing the "page fault bit" that was previously tested in step 98. Steps 95 through 98 are then repeated to reflect any change in the page table having the desired entry and to check that the page fault has been cleared.

When a page fault is no longer detected in step 98, both the page fault and the translation buffer fault have been corrected. To restore the state of the pipeline, the RELOAD signal is set in step 102. Finally, during the next cycle in step 103, the INSTRUCTION DECODE signal is asserted, the RELOAD signal is deasserted and the memory reference is completed.

Only the information necessary to restore the state of the pipeline need be included in the silos, and that information may be highly encoded. Therefore, the number of bits required in each silo may only be a modest increase beyond the number of bits in the registers otherwise required by the pipeline. The control pipeline also can be simplified somewhat by a construction in which the siloed information for a control segment is not sufficient to properly restart its respective activity, because either the state of the control segment does not entirely control its respective activity or is not sufficient for initiating the subsequent activities for the instruction.

Figure 9:
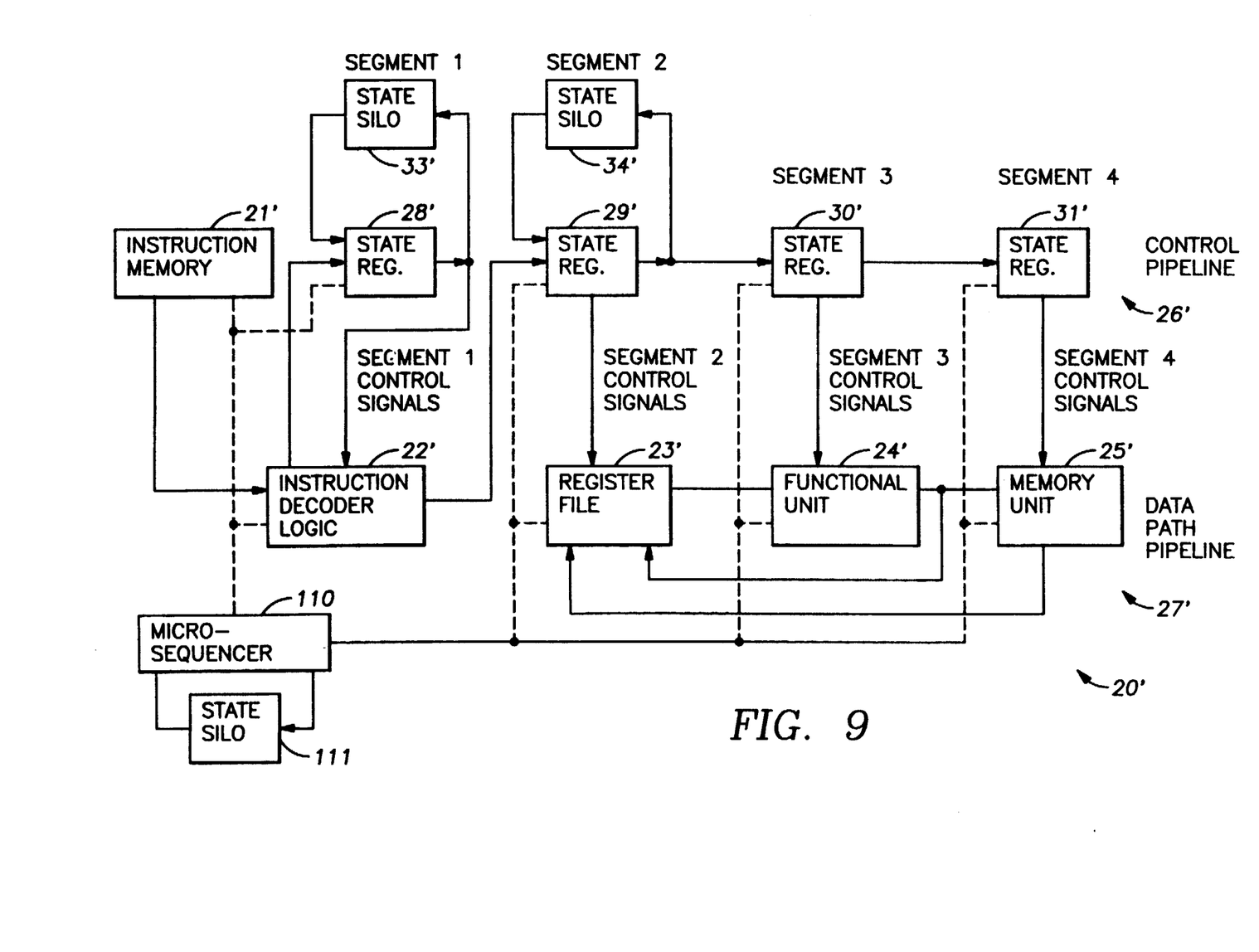
FIG. 9 is a block diagram of a pipelined processor especially adapted for executing variable length macroinstructions.

Shown in FIG. 9 is a pipelined processor generally designated 20' in which the siloed information for the first control segment 28' in a control pipeline 26' is insufficient to properly restart its respective activity because its state does not entirely control the decoding activity and is not sufficient for initiating the subsequent execution activity. The pipelined processor 20' is similar to the pipelined processor 20 of FIG. 2, and similar components are designated with similar but primed reference numerals.

As shown in FIG. 9, the pipelined processor 20' includes a microsequencer 110 which, in addition to the control pipeline segments, controls the operations of the data processing units in the data path pipeline 27' for the normal sequence of execution as well as during the correction of fault conditions.

The microsequencer 110 provides great flexibility in adapting the pipelined processor to various instruction architectures. The instruction memory 21', for example, contains macroinstructions. The second, third and fourth segments of the pipelined processor 20' make up an "execution unit" which is especially adapted to the execution of microinstructions which select specified registers, perform arithmetic or logical operations upon the contents of the selected registers, and store the results back in selected registers or addressed memory locations, or use results as addresses for addressing the memory unit to write results into the memory unit or to read results from the memory unit and store them in the register file.

A particularly advantageous instruction architecture is known as a "variable length architecture" as disclosed in Strecker et al. U.S. Pat. No. 4,236,206 issued Nov. 25, 1980. A variable length instruction, for example, includes an operation code indicating an operation to perform on operands, and specifiers specifying how to obtain the operands. As further disclosed in Strecker et al., it is desirable to use instruction decoder logic for decoding the opcode and specifiers for each variable length instruction, and a microsequencer for issuing a series of microinstructions for each specifier and the opcode.

For the pipelined processor 20', the instruction decoder logic 22' decodes each macroinstruction into individual specifiers and the operation to be performed upon the specified operands. Each time that a new specifier is decoded or when an operation is to be performed upon the decoded specifiers, new execution control information is transmitted from the instruction decoder logic 22' to the state register 29'. This transmission is indicated by a "NEW FLOW" signal.

During a cycle of the PIPELINE CLOCK when the NEW FLOW signal is not asserted, the control segment 29' does not update its state from the instruction decoder logic 22'. Also, whenever a NEW FLOW occurs, a microcode address is dispatched to the microsequencer 110 identifying the particular kind of specifier or operation to be performed. In response to this microcode address, the microsequencer dispatches a microinstruction or control signals which, in combination with the execution control information from the instruction decoder logic 22' determine the specific activity to be performed by the register file 23', functional unit 24' or memory unit 25'.

The microsequencer 110 has a state defined by the address of the microinstruction currently being issued. When a translation buffer fault occurs, the sequential issuing of the microinstructions is interrupted to issue a series of microinstructions in a fault routine. In order to accelerate the interrupt process, the current microcode address is stored in a state silo 111 that is similar to the state silo 33' for the first pipeline segment (i.e., the instruction decoder). Therefore to interrupt the sequential issuing of microinstructions, the microcode address pointer is set to the microcode address of the fault routine. At the end of the fault routine there is a microinstruction which reloads the microcode address pointer with the return address having been saved in the microsequencer's state silo 111.

In the preferred organization for executing variable length macroinstructions, the state information in the state silos 33' of the instruction decoder includes the access type (modify, read, write, branch, address, or variable) and data length (byte, word, long-word or quad-word) information for the current operands for the current macroinstruction, a pointer to indicate the current specifier position in the current instruction in the instruction memory, the last microcode address dispatched to the microsequencer 110, a bit indicating whether the opcode for the current macroinstruction is an "extended" or double-byte opcode, and decoded information for the current specifier indicating whether it has a register or index mode and the specified register number.

The state information stored in the second state silo 34' preferably includes the access type and data length of the current operand, the register number of any general purpose register to be selected from the register file 23', a bit indicating whether the current specifier is a register specifier, a bit indicating whether a floating point operation is to be performed, the register number of a memory temporary register in the register file 23', and the value of a program counter indicating the current macroinstruction being executed.

Because all of the pipeline state information necessary to restore the pipeline to normal operation is saved in the silos during resolution of a translation buffer fault, the fault routine may make full use of all pipeline resources, without having to worry about destroying critical state. Having full use of pipeline resources allows flexibility in the coding of the fault routine executed by the microsequencer.

Figure 10:
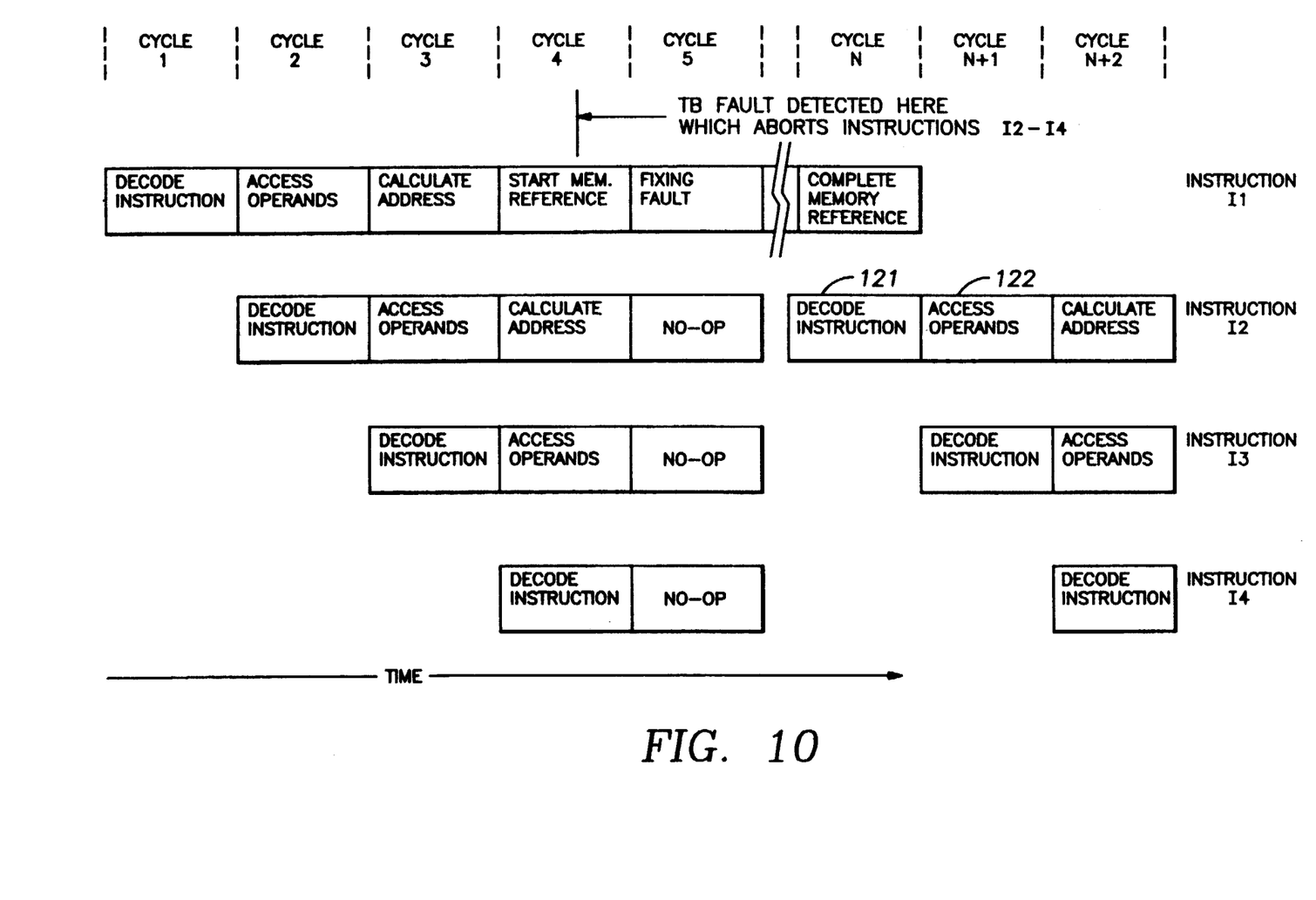
FIG. 10 is a timing diagram illustrating how the processing of instructions is restarted after correction of a translation buffer fault in the pipelined processor of FIG. 9.

Turning now to FIG. 10, there is shown a timing diagram illustrating the restoration of the state of the pipelined processor of FIG. 9 when a translation buffer fault is corrected. In this case the decoding of the second instruction I2 is restarted during the cycle n during which the memory reference for the first instruction I1 is completed. This decoding activity 121 is resumed by reloading of the state of the first segment; however, in order to provide sufficient state information for continuing the activities for the second instruction I2, it is also necessary to restore the state of the second pipeline segment. This need arises from the possibility that the decoding of an instruction could be resumed in a cycle for which a NEW FLOW signal is not asserted at the end of the cycle. In such a case, the second pipeline segment must have the necessary information to perform its activity 122 during the subsequent cycle n+1, because state information will not be updated from the first segment.

Figure 11:
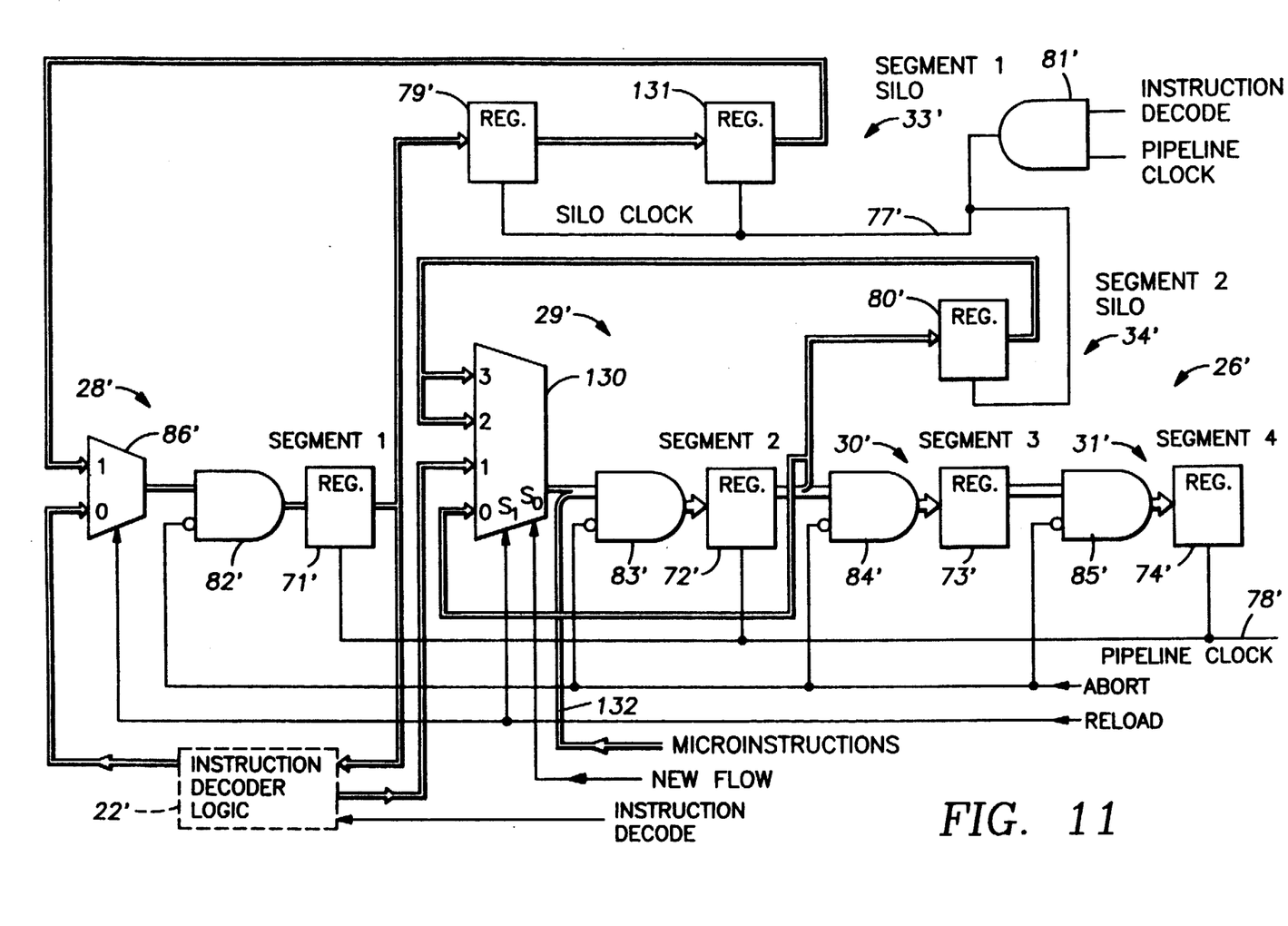
FIG. 11 is a detailed schematic diagram of the control pipeline in the pipelined processor of FIG. 9.

Turning now to FIG. 11, there is shown a more detailed schematic diagram of the control pipeline 26' for the processor 20' of FIG. 9. The control pipeline 26' is similar to the control pipeline of FIG. 5 and similar components are given similar but primed reference numerals. Since the second segment of the control pipeline 26' receives new control information from the instruction decoder logic 22' only when the NEW FLOW signal is asserted, the second segment 29' is configured to hold such control information when the NEW FLOW signal is not asserted. For this purpose a multiplexer 130 receives the control information from the output of the second segment register 72' and feeds it back when the NEW FLOW signal is not asserted.

The control pipeline 26' of FIG. 11 is also different from the control pipeline 26 of FIG. 5 due to the fact that it is desirable to restore the state of the first segment 28' to the state needed to decode the instruction I2 immediately following the instruction I1 having caused the translation buffer fault, as previously described in FIG. 10. Since there are two pipeline clock cycles between the activity being performed in the first segment when the fault is detected (decoding instruction I4) and the activity that should be performed in the second segment when the state of the second segment is restored (decoding instruction I2), the segment one silo 33' has a register 79' and an additional register 131.

As described above, it is also necessary to restore the state of the second segment because the "NEW FLOW" signal is not asserted every cycle. It might appear at first that the segment two silo 34' would need two registers in order to restore the state of the second segment 29' existing at the time that the first segment was performing the activity to be restarted (i.e., the decoding of instruction I2). However, since the information to be reloaded into the second segment 29' is needed only when the second segment state information would not have been changed during the cycle following the decoding of instruction I2, the segment two silo 34' need have only one register 80' to restore the second segment with the necessary state information when the information is in fact needed. In general, for a pipeline in which it is necessary to restore the states of successive segments merely for the purpose of continuing the execution of an instruction from one segment to another, the length of the silo associated with each segment to be restored is equal to the distance between that segment and the one in which the instruction to be restarted was executing when the fault was detected.

It should also be apparent from FIG. 10 that the second segment of the pipeline does not perform any activity even though state information has been restored into the second segment 29' of the control pipeline. No activity is performed in the second segment due to the fact that the state information having been restored in the second segment of the control pipeline 26' is not complete enough to cause any activity to be performed in the second segment of the pipeline. As shown in FIG. 11, for example, segment two silo 34' saves only the state information received from the instruction decoder 22' and it does not save the microinstructions issued by the microsequencer. Therefore, when the second segment 29' is reloaded, it will not be reloaded with the information necessary to cause any activity to be performed in the second segment of the pipeline. Also, during the execution of the fault routine, the microsequencer can issue microinstructions in the usual way over a bus 132 to the control pipeline 26'.

We claim:

1. A method of operating a pipelined processing unit in a digital computer, said pipelined processing unit having a plurality of pipelined segments; said pipelined segments including an instruction decoding segment, and a plurality of execution segments for processing data; said instruction decoding segment having means for decoding instructions one after another to generate a corresponding sequence of control information for said processing of said data in accordance with said instructions, a first state register storing state information of said instruction decoding segment, and a first set of silo registers for saving state information from said first state register, said state information of said instruction decoding segment being restored from said first set of silo registers at a later point in time in order to restart said decoding to regenerate a sequence of control information having been previously generated; said execution segments including at least an execution segment having a memory unit for storing and fetching said data and another execution segment having a functional unit for performing operations upon said data; said processing of said data causing a fault that must be corrected before said processing of said data can be completed; a first one of said execution segments having a second state register for storing state information of said first one of said execution segments, and a second set of silo registers for saving state information from said second state register, wherein said state information of said first one of said execution segments is dependent upon said control information and is restored at said later point in time from said second set of silo registers; said method comprising the steps of:
   a) operating said instruction decoding segment to decode a sequence of said instructions to obtain a corresponding sequence of said control information, and while operating said instruction decoding segment, sequentially saving the state information from said first state register in said first set of silo registers,
   b) during said operating of said instruction decoding segment, operating said plurality of execution segments in response to said sequence of control information to sequentially and simultaneously process said data in accordance with said sequence of instructions, and during said operating of said plurality of execution segments, sequentially saving the state information from said second state register in said second set of silo registers,
   c) when said fault is caused by said processing of said data, interrupting the operation of said instruction decoding segment and said plurality of execution segments, using at least one of said execution segments to correct said fault, and after said fault is corrected, restoring the state of said decoding segment with prior state information having been saved in said first set of silo registers, and restoring the state of said first execution segment with prior state information having been saved in said second set of silo registers so that said operating of said decoding segment and said plurality of execution segments is resumed.

2. The method as claimed in claim 1, wherein said fault is caused by said memory unit attempting to access a translation buffer with a memory address for which a translation is not stored in said translation buffer, and said method further includes using said memory unit to correct the fault by transferring said translation for said memory address from an addressable memory to said translation buffer.

3. The method as claimed in claim 1, wherein said fault is caused by said memory unit attempting to access data that does not reside in said memory unit, and wherein said method further includes using said execution segments to correct the fault by transferring data to said memory unit.

4. The method as claimed in claim 1, wherein said method further includes clocking said first and second sets of silo registers by a common clocking signal to perform said sequential saving of said state information from the first state register and said state information from the second state register, and inhibiting the clocking of said sets of silo registers by said common clocking signal when said at least one of the execution segments is used to correct said fault.

5. The method as claimed in claim 1, wherein said restoring the state of said decoder segment and said restoring the state of said first one of said execution segments are performed by operating respective multiplexers.

6. The method as claimed in claim 1, wherein said plurality of execution segments are operated by a common pipeline clocking signal to sequentially and simultaneously process said data, and said method further includes changing said state information of said first one of said execution segments to new state information during some of the cycles of said pipeline clocking signal when a control signal from said instruction decoding segment is asserted, said new state information being dependent upon said control information generated by said instruction decoding segment, and preventing said state information of said first one of said execution segments from changing during other cycles of said pipeline clocking signal when said control signal is not asserted.

7. The method as claimed in claim 6, wherein the state information from said first state register is saved in said first set of silo registers by saving the state information from said first state register in each of a first number of registers in said first set of silo registers, and the state information from said second state register is saved in said second set of silo registers by saving the state information from said second state register in each of a second number of registers in said second set of silo registers, wherein said first number is greater than said second number.

8. A pipelined processing unit for a digital computer, said pipelined processing unit comprising a plurality of pipelined segments; said pipelined segments including an instruction decoding segment, and a plurality of execution segments for processing data; said instruction decoding segment having means for decoding instructions one after another to generate a corresponding sequence of control information for said processing of said data in accordance with said instructions, a first state register storing state information of the instruction decoding segment, first means including a first set of silo registers for saving state information from said first state register during said processing of data and first means for restoring said state information of said means for decoding with state information from said first set of silo registers at a later point in time in order to restart said decoding to regenerate a sequence of control information having been previously generated; said execution segments including at least an execution segment having a memory unit for storing and fetching said data and another execution segment having a functional unit for performing operations upon said data; said processing of data causing a fault that must be corrected before said processing of said data can be completed; a first one of said execution segments having a second state register for storing state information of said first one of said execution segments, second means including a second set of silo registers for saving state information from said second state register during said processing of data and second means for restoring the state information of said first one of said execution segments with state information from said second set of silo registers at said later point in time in order to restart the processing of said data having previously been performed in response to said control information having been previously generated; and fault sequencing means for interrupting the operation of said pipelined segments and the operation of said first and second means for saving when said fault is caused by said processing of data, using at least one of said execution segments to correct said fault, and after said fault is corrected, operating said first and second means for restoring at said later point in time to restore the state of said decoding segment and said first one of said execution segments so that the interrupted operation of said pipelined segments is restored.

9. The pipelined processing unit as claimed in claim 8, wherein said digital computer includes an addressable memory connected to said memory unit, said memory unit includes a translation buffer for storing translations for memory addresses, said fault is caused by said memory unit attempting to access said translation buffer with a memory address for which a translation is not stored in said translation buffer, and said fault sequencing means includes means for using said memory unit to correct said fault by transferring said translation for said memory address from said addressable memory to said translation buffer.

10. The pipelined processing unit as claimed in claim 8, further comprising means for clocking said first and second sets of silo registers with a common clocking signal and means operated by said fault sequencing means for inhibiting said clocking signal to save said state information of said decoding segment and said state information of said first one of said execution segments when said fault is caused by said processing of data.

11. The pipelined processing unit as claimed in claim 10, wherein said first set of silo registers includes a first silo register having a data output and a data input receiving said state information from said first state register, and a second silo register having a data input receiving the data output of said first silo register.

12. The pipelined processing unit as claimed in claim 8, wherein said first and second means for restoring comprise respective multiplexers operated by said fault sequencing means for restoring the state information of said decoding segment and the state information of said first one of said execution segments.

13. The pipelined processing unit as claimed in claim 8, wherein said plurality of execution segments receive a common pipeline clocking signal for sequentially and simultaneously processing said data, and said first one of said execution segments includes a multiplexer having an output connected to a data input of said second state register, a first input receiving state information of said first one of said execution segments, a second input receiving state information from said second state register, a third input receiving state information from said second set of silo registers, a first select input receiving a control signal from said instruction decoder segment for selecting cycles of said pipeline clocking signal when said second state register receives said state information of said first one of said execution segments, and a second select input receiving a reload signal from said fault sequencing means for selecting a cycle of said pipeline clock signal when said second state register receives state information from said second set of silo registers at said later point in time to restore the state of said first one of said execution segments.

14. The pipelined processing unit as claimed in claim 13, wherein said first set of silo registers includes more silo registers than said second set of silo registers.

15. The pipelined processing unit as claimed in claim 8, wherein each of said execution segments has a respective state register for storing state information of said each of said execution segments, the state registers of said execution segments being arranged in a series to form a control pipeline, said control pipeline further including means responsive to an abort signal for aborting the state information stored in said state registers of said execution segments to enable said fault sequencing means to interrupt the operation of said execution segments of said pipeline.

16. A pipelined processing unit for a digital computer, said pipelined processing unit including a control pipeline, a data path pipeline, and a microsequencer; said data path pipeline comprising a plurality of data path segments including an instruction decoder segment and a plurality of execution segments; said execution segments including a register file segment for storing operands, a functional unit segment for performing operations upon operands stored in said register file segment to obtain results, and a memory unit segment for storing and retrieving operands and results from addressable memory locations; said control pipeline including a series of respective pipeline registers storing state information controlling the operation of respective ones of the data path segments; said microsequencer providing coordinated control of said control pipeline and said data path pipeline; said instruction decoder segment including decoding logic means for decoding variable length instructions into operand specifiers and said operations to perform upon operands specified by said operand specifiers; said microsequencer having means for issuing a series of microinstructions controlling said data path pipeline for the operand specifiers and said operations decoded by said decoding logic means; wherein the pipeline register storing state information controlling a first one of said execution segments receives state information from said instruction decoder segment when an operand specifier and an operation are decoded;

said pipelined processing unit further including a first state silo for saving state information of said decoding segment, a second state silo for saving state information of said first one of said execution segments, and a third state silo for saving state information for controlling said microsequencer; each of the state silos including a set of silo registers for receiving the state information saved by said each of the state silos during a normal sequence of instruction execution in said data path pipeline; the operation of said memory unit during said normal sequence of instruction execution causing a fault interrupting said normal sequence until said fault is corrected; said state silos storing sufficient state information to immediately resume said normal sequence of instruction execution after said fault is corrected; and said microsequencer including means responsive to said fault for issuing microinstructions in a fault routine for using said memory unit to correct said fault, and reloading said state information having been saved in said state silos to resume said normal sequence of instruction execution.

17. The pipelined processing unit as claimed in claim 16, wherein said digital computer includes an addressable memory connected to said memory unit segment, said memory unit segment includes a translation buffer for storing translations for memory addresses, said fault is caused by said memory unit segment attempting to access said translation buffer with a memory address for which a translation is not stored in said translation buffer, and said fault routine includes at least one microinstruction for transferring said translation of said memory address from said addressable memory to said translation buffer.

18. The pipelined processing unit as claimed in claim 16, further comprising means for clocking the silo registers in said state silos with a common clocking signal during said normal sequence of instruction execution, and inhibiting said clocking of the silo registers in said state silos when said normal sequence of instruction execution is interrupted.

19. The pipelined processing unit as claimed in claim 16, further comprising respective multiplexers operated by at least one microinstruction in said fault routine for reloading said state information having been saved in said state silos to resume said normal sequence of instruction execution.

20. The pipelined processing unit as claimed in claim 16, wherein said pipeline registers in said control pipeline receive a common pipeline clocking signal; said instruction decoder segment includes means for generating a control signal when an operand specifier and an operation are decoded; said control pipeline includes a multiplexer having a data output connected to a data input of the pipeline register storing state information controlling said first one of said execution segments, a first data input receiving state information from said instruction decoder, a second data input receiving state information from said pipeline register storing state information controlling said first one of said execution segments, and a control input responsive to said control signal from said instruction decoder segment for selecting said first data input when said control signal is asserted and selecting said second data input when said control signal is not asserted; and the state silo receiving the state information controlling the operation of said instruction decoder segment includes more registers than the state silo receiving the state information governing the operation of said first one of said execution segments.

* * * * *